Figure 1:
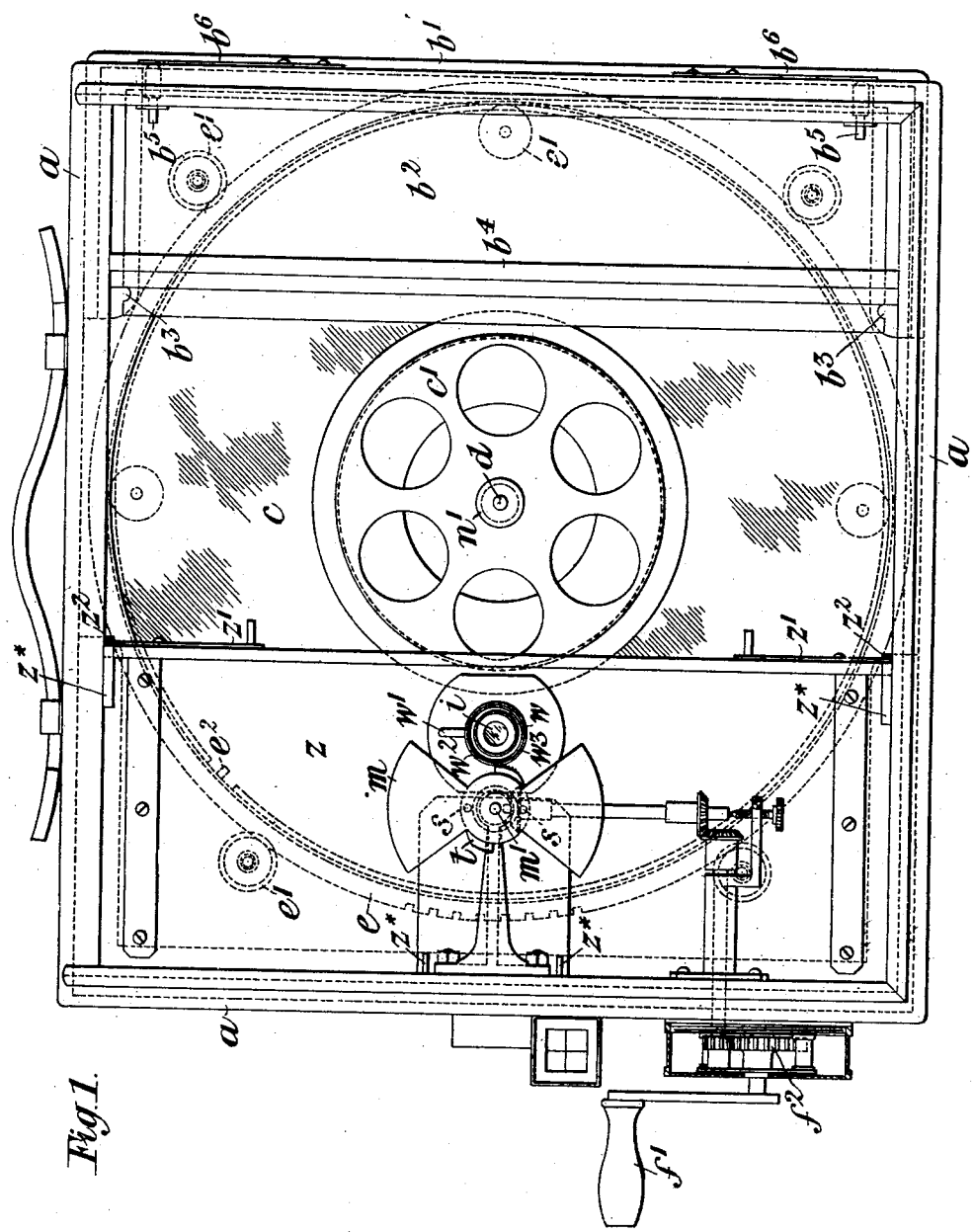

No. 708,148. Patented Sept. 2, 1902.
L. U. KAMM.
APPARATUS FOR PHOTOGRAPHING AND EXHIBITING KINEMATOGRAPHIC PICTURES.
(Application filed July 23, 1900.)
(No Model.) 3 Sheets—Sheet 1.

Witnesses
Inventor

No. 708,148. Patented Sept. 2, 1902.
L. U. KAMM.
APPARATUS FOR PHOTOGRAPHING AND EXHIBITING KINEMATOGRAPHIC PICTURES.
(Application filed July 23, 1900.)
(No Model.) 3 Sheets—Sheet 2.
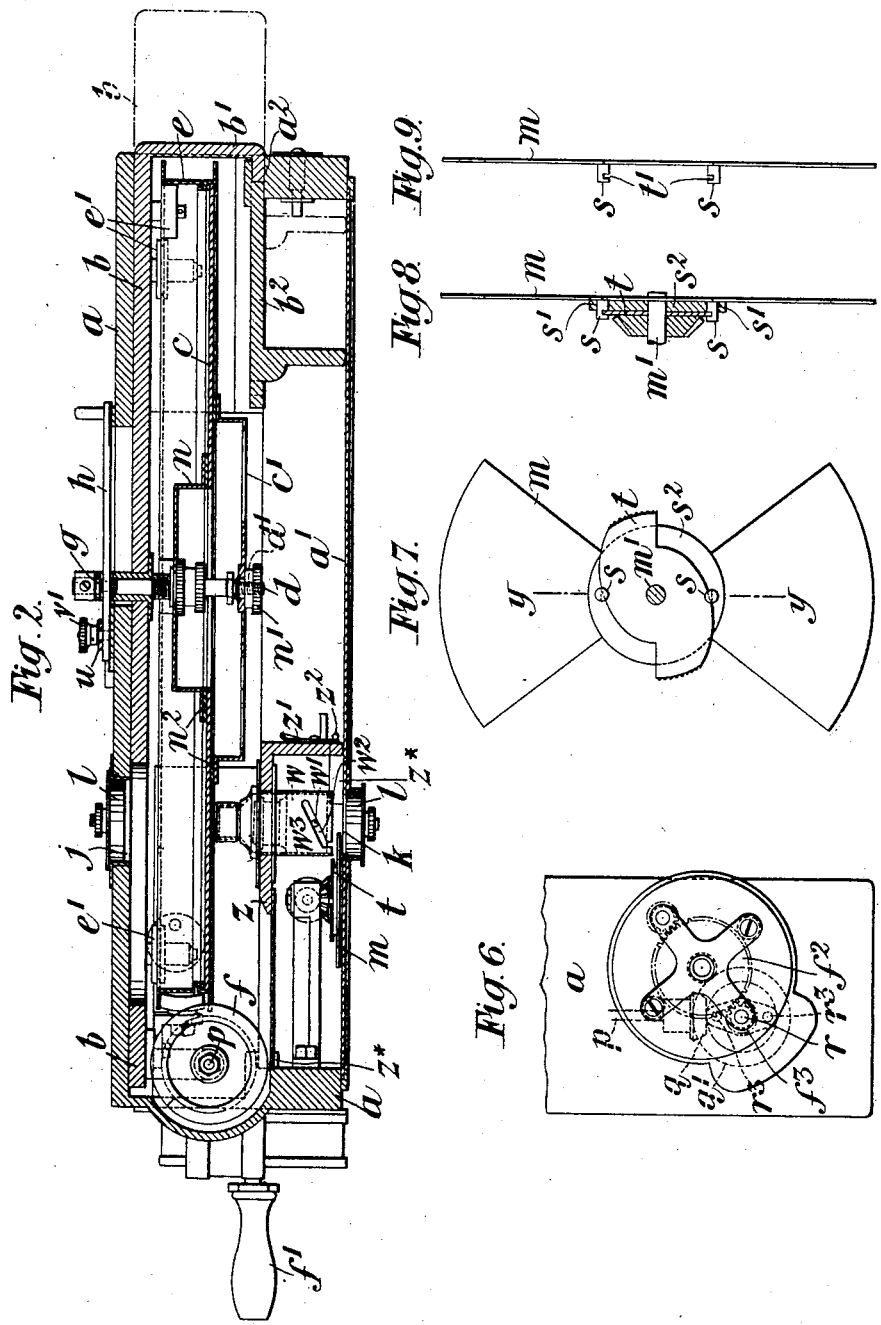

No. 708,148. Patented Sept. 2, 1902.
L. U. KAMM.
APPARATUS FOR PHOTOGRAPHING AND EXHIBITING KINEMATOGRAPHIC PICTURES.
(Application filed July 23, 1900.)
(No Model.) 3 Sheets—Sheet 3.
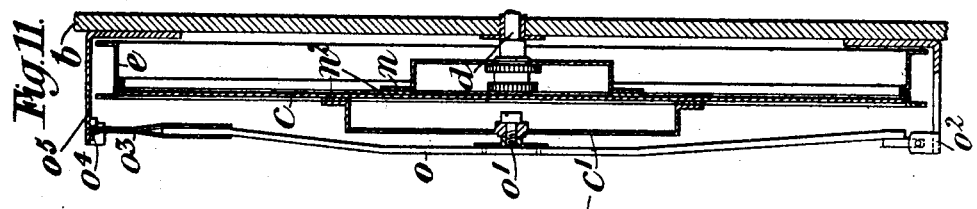
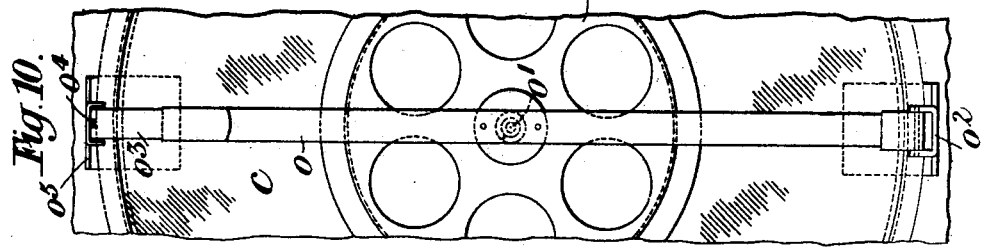
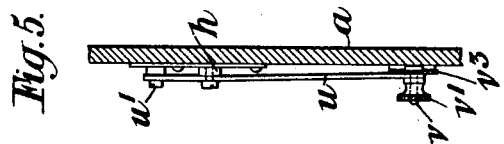
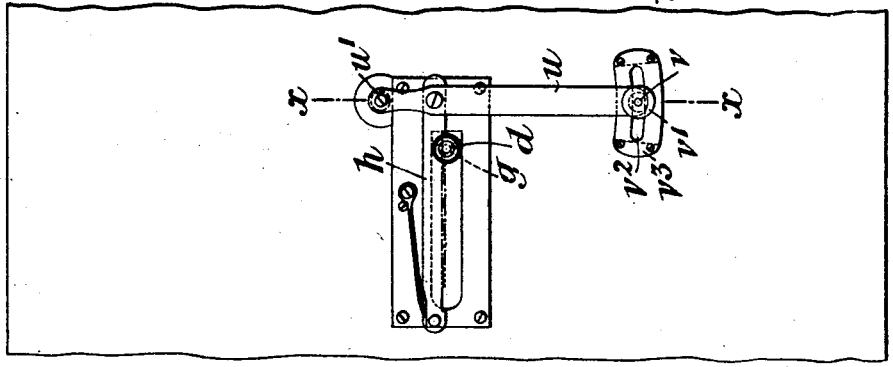
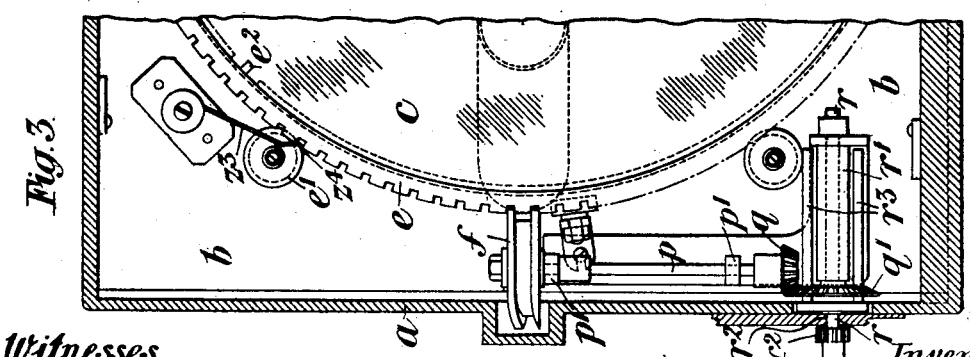
Witnesses. Inventor

UNITED STATES PATENT OFFICE.

LEONARD ULRICH KAMM, OF LONDON, ENGLAND.

APPARATUS FOR PHOTOGRAPHING AND EXHIBITING KINEMATOGRAPHIC PICTURES.

SPECIFICATION forming part of Letters Patent No. 708,148, dated September 2, 1902.

Application filed July 23, 1900. Serial No. 24,630. (No model.)

*To all whom it may concern:*

Be it known that I, LEONARD ULRICH KAMM, a subject of the Queen of Great Britain, residing at London, England, have invented new and useful Improvements in Apparatus for Photographing and Exhibiting Kinematographic Pictures, (for which I have applied for a patent in Great Britain, No. 311, dated January 5, 1900,) of which the following is a specification.

This invention relates to apparatus for photographing and exhibiting kinematographic pictures of the kind in which the pictures are arranged in a spiral series on a transparent ring or disk; and it comprises the improvements hereinafter described.

In the annexed drawings, Figure 1 is a rear view of the apparatus provided with my improvements, the back being removed to show the interior mechanism. Fig. 2 is a horizontal section of the apparatus. Fig. 3 is a sectional elevation of the left-hand portion of the apparatus looking from the back. Fig. 4 is a view of a portion of the front part of the apparatus. Fig. 5 is a section on the line $xx$ in Fig. 4. Fig. 6 is a view of a portion of the left-hand side shown in Fig. 3 and showing some of the driving mechanism. Fig. 7 is a sectional elevation drawn to a larger scale than Figs. 1 to 6, showing how the rotating shutter can be readily connected to and disconnected from its driving-shaft. Fig. 8 is a sectional side view of the same, the section being on the line $yy$ in Fig. 7. Fig. 9 is an edge view of the shutter detached. Fig. 10 is a rear elevation drawn to the same scale as Figs. 1 to 6, showing means for clamping the picture-plate in position when in the form of a disk; and Fig. 11 is a sectional side elevation of the same.

$a$ is the case of the apparatus, having the sliding back $a'$, and $b$ is a slide carrying the sensitized or picture plate $c$ through the medium of a clamping-plate $c'$, a shaft $d$, and toothed ring $e$, supported upon rollers $e'$ and operated intermittently by a spiral cam $f$ from a handle $f'$ and gear-wheels $f^2 f^3$, the plate $c$ being notched to engage a pin $e^3$ on the ring $e$.

$g$ is a pinion carried on the shaft $d$ and engaging a rack-bar $h$, so that when rotated it is caused to move the slide $b$, the rack-bar being pivoted at one end, so that it can be moved against the pressure of a spring to disengage it from the pinion $g$ when it is required to move the pinion back to its initial position. The said spring serves to keep the rack-bar and pinion in gear.

$i$ is a lens, and $j k$ are openings in the front and back of the case $a$, respectively, and in line with the said lens, which openings can be closed by plugs or caps $l$.

$m$ is a shutter on the shaft $m'$, designed to be rotated between the lens $i$ and the opening $k$ in the back $a'$ of the case $a$ by gearing from the wheel $f^2$.

All of the foregoing parts are of known construction.

The improvements according to my invention are as follows:

I arrange the slide $b$, which carries the sensitized or picture plate $c$, to slide horizontally within the case $a$, and in order that the width of the apparatus shall not be increased in consequence I arrange the said slide to slide through an opening $a^2$ in one side of the case telescopewise, as shown clearly in Fig. 2, the said slide being formed with end and rear walls $b' b^2$, respectively, so as to inclose the plate $c$ at this part and prevent it being exposed through the opening $a^2$, the wall $b^2$ being detachable, so that the plate $c$ can be removed and another placed in position within the ring $e$. The wall $b^2$ when in position on the slide $b$ is prevented moving sidewise by recesses on it engaging projections $b^3$ on the said slide. It is also prevented from moving backward when the back $a'$ is in position by a strip $b^4$, formed upon it.

For fixing the sensitized or picture plate $c$ to the shaft $d$ on the slide $b$ I arrange a disk $n$, fixed on the said shaft, against which disk the sensitized or picture plate $c$ is clamped by the clamping-disk $c'$. This clamping is conveniently effected when the said plate is in the form of a ring, as in Figs. 1, 2, and 3, by means of a nut $n'$, loose on the clamping-disk and engaging a screw-thread $d'$ on the said shaft, which shaft passes through the opening in the sensitized or picture plate $c$, and in order to prevent any slip between the plate $c$ and the two disks the latter are conveniently faced with india-rubber or the like $n^2$.

When using a plate $c$ in the form of a disk, as shown in Figs. 10 and 11, and not of a ring, I dispense with the portion of the shaft $d$ which was described as passing through the ring form of plate and I provide a bar $o$, which extends diametrically across the said disk plate and carries the clamping-disk $c'$ on a pivot $o'$, one end of the said bar being hinged to the slide $b$ through the medium of a bracket $o^2$, while the other end is attached to the said slide by a suitable fastening, such as a spring-catch, for instance. The end of the bar $o$ is conveniently provided with a spring portion $o^3$, engaging beneath a pin or projection $o^4$ on a bracket $o^5$ on the slide $b$. In practice I prefer to arrange the bar $o$ diagonally on the slide $b$, it being the only position in which it can be arranged without materially interfering with the mechanism or necessitating an increase in the size of the case $a$.

The spiral cam $f$ for intermittently rotating the ring $e$, carrying the plate $c$, I arrange on a vertical shaft $p$ in bearings $p'$ on the slide $b$, operated by bevel-wheels $q$ $q'$ from a horizontal shaft $r$, also in bearings $r'$ $r^2$ on the slide $b$ and case $a$, respectively, and connected to the gear-wheel $f^3$, and consequently to the driving-handle, the said horizontal shaft $r$ being formed in parts designed to telescope together, so that the driving connection is maintained between the said parts notwithstanding the movement of the slide $b$. One part of the said telescopic shaft can conveniently be formed with a fork $r^3$, engaging holes in a disk on the other part. In practice I prefer to utilize the bevel-wheel $q'$ for this disk.

In order that different forms of shutter (according to whether pictures are being taken or exhibited) may be readily attached or detached, the said shutters, as shown in Figs. 1, 7, 8, and 9, are each conveniently provided with pins $s$ $s$, engaging holes $s'$ $s'$ in a disk $s^2$ on the shutter-shaft $m'$, a cam-plate $t$ on the said shaft being designed when rotated to engage with notches $t'$ in the pins (when the latter are placed within the said holes) and hold the shutter in position, as indicated in the said figures.

When exhibiting pictures, it sometimes happens that the center of the spiral series of pictures does not quite coincide with the center of the lens $i$. In order that they may be made to coincide, I provide for adjusting the picture-plate $c$. This may conveniently be effected by pivoting the rack-bar $h$, hereinbefore referred to, on an adjustable lever $u$, fulcrumed to the case $a$ at $u'$, and the outer end of which can be clamped when adjusted by any suitable means, such as a bolt $v$ and nut $v'$, engaging a slot $v^2$ in a plate $v^3$ on the case $a$. By loosening the nut $v'$ on the bolt $v$ and moving the lever $u$ on its fulcrum $u'$ the rack-bar $h$ will be caused to move longitudinally, and consequently move also the shaft $d$ and picture-plate $c$.

In order that the lens $i$ may be easily and simply adjusted for focusing, I provide the tube or cell $w$, carrying the lens, with a pin $w'$, engaging a spiral slot $w^2$ in a supporting-tube $w^3$, so that by turning the lens on its axis by means of the pin $w'$ the lens will be caused to move longitudinally in the said supporting-tube. The lens $i$ in the supporting-tube $w^3$ is carried upon a partition $z$, secured to the case, but which is detachable therefrom, so that the plate $c$ can be removed, it being placed in position behind pins and strips $z^*$ on the case and secured by pivoted plates $z'$, engaging behind pins $z^2$.

$z^3$, Fig. 3, is a spring-arm provided with an end $z^4$, designed to engage in the recess between two adjacent teeth of the ring $e$ in order to hold the picture-plate $c$ rigidly in the interval between each movement by the cam $f$.

$b^5$ represents pins acted upon by springs $b^6$ and projecting through one side of the case $a$, so that when the pinion $g$ has traveled to the outer end of the rack $h$ and become disengaged from the teeth thereof the strip $b^4$ on the slide $b$ will impinge against the said pins and be pressed back, so as to keep the pinion in contact with the last tooth of the rack, so that if the handle $f'$ be turned backward the pinion $g$ will be caused to again engage the rack $h$.

Having now described my invention, what I claim as new, and desire to secure by Letters Patent, is—

1. In apparatus for photographing and exhibiting kinematographic pictures the combination of an outer casing, a lens connected to the said casing, an intermittently-rotated picture-plate, a toothed ring and spiral cam for effecting the intermittent rotation of the picture-plate, a rectilinearly-sliding plate carrying the said picture-plate and moving it relatively with the lens and telescoping through one end of the outer casing and a rack-bar and pinion for effecting the rectilinear movement of the sliding plate substantially as described.

2. In apparatus for photographing and exhibiting kinematographic pictures the combination of an outer casing, a lens connected to the said casing, an intermittently-rotated picture-plate, a toothed ring and spiral cam for effecting the intermittent rotation of the picture-plate, a rectilinearly-sliding plate carrying the said picture-plate and moving it relatively with the lens and telescoping through one end of the outer casing, a rack-bar and pinion for effecting the rectilinear movement of the sliding plate and wall upon the sliding plate where it telescopes through the outer casing to prevent the disclosure of the picture-plate substantially as described.

3. In apparatus for photographing and exhibiting kinematographic pictures, the combination of an outer casing, a lens connected to the said casing, an intermittently-rotated ring-shaped picture-plate, a rectilinearly-sliding plate carrying the said picture-plate and moving it relatively with the lens and telescoping through one end of the outer casing, a toothed ring supporting the picture-plate upon the rectilinearly-sliding plate, a clamping-disk, a shaft for operating mechanism for moving the sliding plate rectilinearly, a rack and pinion comprising such mechanism, a disk connected to the said shaft on the side of the picture-plate opposite to that of the clamping-disk and against which the picture-plate is designed to be clamped and means carried by the said shaft for securing the clamping-disk against the picture-plate substantially as described.

4. In apparatus for photographing and exhibiting kinematographic pictures, the combination of an outer casing, a lens connected to the said casing, an intermittently-rotated ring-shaped picture-plate, a rectilinearly-sliding plate carrying the said picture-plate and moving it relatively with the lens and telescoping through one end of the outer casing, a toothed ring supporting the picture-plate upon the rectilinearly-sliding plate, a clamping-disk, a shaft for operating mechanism for moving the sliding plate rectilinearly, a rack and pinion comprising such mechanism, a disk connected to the said shaft on the side of the picture-plate opposite to that of the clamping-disk and against which the picture-plate is designed to be clamped, a nut loosely connected with the clamping-disk and a screw-thread on the said shaft for the engagement of the nut, substantially as described.

5. In apparatus for photographing and exhibiting kinematographic pictures, the combination of an outer casing, a lens connected to the said casing, an intermittently-rotated picture-plate, a rectilinearly-sliding plate carrying the said picture-plate and moving it relatively with the lens and telescoping through one end of the outer casing a toothed ring supporting the picture-plate, means for moving the picture-plate rectilinearly, an operating-handle, gear-wheels and spiral cam for intermittently rotating the picture-plate and a telescopic driving device for the spiral cam, one portion of which device is carried by the case of the apparatus and the other part by the rectilinearly-sliding plate carrying the picture-plate substantially as described.

6. In apparatus for photographing and exhibiting kinematographic pictures, the combination of an outer casing, a lens connected to the said casing, an intermittently-rotated picture-plate, a rectilinearly-sliding plate carrying the said picture-plate and moving it relatively with the lens and telescoping through one end of the outer casing a toothed ring supporting the picture-plate, means for moving the picture-plate rectilinearly, an operating-handle, gear-wheels and spiral cam for intermittently rotating the picture-plate and a telescopic driving device for the spiral cam comprising a shaft carried by the case of the apparatus, a fork on the said shaft, a disk engaging the said fork and a shaft carrying the disk and supported on the rectilinearly-sliding plate carrying the picture-plate substantially as described.

7. In apparatus for photographing and exhibiting kinematographic pictures, the combination of an outer casing, a lens connected to the said casing, an intermittently-rotated picture-plate, a toothed ring and spiral cam for effecting the intermittent rotation of the picture-plate a rectilinearly-sliding plate carrying the said picture-plate and moving it relatively with the lens and telescoping through one end of the outer casing, a rack-bar and pinion for effecting the rectilinear movement of the picture-plate, a lever pivoted to the case of the apparatus and jointed to the rack-bar and means whereby it can be clamped upon its fulcrum, substantially as and for the purpose set forth.

8. In apparatus for photographing and exhibiting kinematographic pictures, the combination of an outer casing, a lens connected to the said casing, an intermittently-rotated picture-plate, a toothed ring and spiral cam for effecting the intermittent rotation of the picture-plate a rectilinearly-sliding plate carrying the said picture-plate and moving it relatively with the lens and telescoping through one end of the outer casing, a rack-bar and pinion for effecting the rectilinear movement of the picture-plate, a lever pivoted to the case of the apparatus and jointed to the rack-bar, a bolt, a nut engaging therewith and a slotted plate fixed to the case of the apparatus and through which the bolt passes substantially as and for the purpose set forth.

In witness whereof I have hereunto set my hand in presence of two witnesses.

LEONARD ULRICH KAMM.

Witnesses:
H. BEEVOR HARVEY,
WILLIAM ENGELKE.